United States Patent [19]

Mosebach et al.

[11] Patent Number: 4,632,676
[45] Date of Patent: Dec. 30, 1986

[54] METHOD AND DEVICE FOR STRIPPING AMMONIACAL WATER COUNTERCURRENTLY WITH STEAM

[75] Inventors: Wilhelm Mosebach, Kamen-Methler; Dieter Breidenbach, Waltrop, both of Fed. Rep. of Germany

[73] Assignee: Firma Carl Still GmbH & Co. KG, Recklinghausen, Fed. Rep. of Germany

[21] Appl. No.: 449,827

[22] Filed: Dec. 14, 1982

Related U.S. Application Data

[63] Continuation of Ser. No. 241,011, Mar. 6, 1981, abandoned.

[30] Foreign Application Priority Data

Mar. 9, 1980 [DE] Fed. Rep. of Germany ....... 3009060

[51] Int. Cl.[4] .......................................... B01D 19/00
[52] U.S. Cl. .......................................... 55/50; 55/54; 55/70
[58] Field of Search ................... 55/47, 49, 50, 54, 70; 423/238, 549, 550

[56] References Cited

U.S. PATENT DOCUMENTS

| 932,758 | 8/1909 | Collin | 55/70 X |
|---|---|---|---|
| 1,450,562 | 4/1923 | Piette | 423/550 |
| 1,654,782 | 1/1928 | Bird | 423/550 X |
| 2,012,621 | 8/1935 | Bennett | 55/50 |
| 3,054,726 | 9/1962 | Fields et al. | 55/70 |
| 3,754,376 | 8/1973 | Kent | 55/54 X |
| 3,920,419 | 11/1975 | Schroeder et al. | 55/70 |
| 4,248,608 | 2/1981 | Giammarco et al. | 55/54 X |

Primary Examiner—Robert Spitzer
Attorney, Agent, or Firm—McGlew and Tuttle

[57] ABSTRACT

In a method of stripping ammonia from water using steam in countercurrent flow, wherein steam is supplied over a sump of a stripper and directed along with the stripped gas component from a head of the stripper, the method comprising keeping the counterpressure constant while the temperature of supplied ammoniacal water is elected and the partial pressure of the component to be stripped is correspondingly lowered by adding compressed saturated vapors which have not been cooled and correspondingly reducing the steam volume.

3 Claims, 2 Drawing Figures

METHOD AND DEVICE FOR STRIPPING AMMONIACAL WATER COUNTERCURRENTLY WITH STEAM

This is a continuation of application Ser. No. 241,011 filed Mar. 6, 1981, now abandoned.

FIELD AND BACKGROUND OF THE INVENTION

The invention relates to a method of stripping ammoniacal water countercurrently with steam in equipment in which the steam is supplied over a sump of a stripper and directed, along with the stripped gas component, from the head of the stripper to a saturator for producing ammonium sulfate, wherefrom vapors saturated with water vapor flow out.

The invention is particularly concerned with the further processing of ammonia from coking plants. The invention may preferably be applied to the so termed indirect method. In this method, the so called gas water in which the ammonia is partly dissolved is obtained aside from the tar by indirect gas cooling. In a following water scrubbing process which takes place in special wash towers, the ammonia still left in the gas is washed out. From the ammoniacal water, a gas is stripped by means of steam, and this gas is reacted in the saturator with sulfuric acid, to obtain ammonium sulfate. The ammonium sulfate is discharged in crystalline form. As a rule, the available amount of vapors produced in the saturator is further processed because these vapors, especially in indirectly operating units, contain considerable amounts of raw substances such as hydrogen sulfide, carbon dioxide, hydrocyanic acid, etc. For this purpose, heat is removed from the saturator vapors in special coolers.

In practice, it is sought to reduce the heat requirement of the various processing stages to a low level. On the other hand, the stripper is to be operated so as to strip the gaseous phase completely. This is effected mostly at the different levels of the stripper, designated as bubble trays, and is to be done so as to remove from the sump of the stripper substantially ammonia-free water and, at the stripper head, the total gas phase as far as possible. From the stripper head, the gas phase must then be removed while surmounting the counterpressure building up in the saturator.

In a plant unit of this kind, the water supply to the stripper amounts to about 56 m$^3$/h with 15 g NH$_3$, 60 g CO$_2$, and 7 g of H$_2$S per liter, and a temperature of 98° C. at the head. In the sump of the stripper, the temperature is 110° C. Assuming these conditions, it may be found that 9.8 t/h are needed as the heat requirement. The useful heat may be broken down as follows:

| | |
|---|---|
| Heating of the water | 51.4% |
| Heat of reaction | 9.2% |
| Heat dissipation loss | 1.8% |
| Heat of the vapors | 37.6% |

More accurate measurements have shown, however, that at 98° C. and with a counterpressure of about 11,700 kg/m$^2$ (total pressure) the NH$_3$ partial pressure in the gas phase amounts to 2,250 kg/m$^2$. The NH$_3$ equilibrium partial pressure above the hot ammoniacal water having a temperature of 60° C. is about 383 kg/m$^2$.

Experience has shown, however, that under these conditions, at the highest trays of the stripper, the NH$_3$ is not stripped but washed out because ammonia gas has the property of dissolving in water of predetermined temperature in corresponding amounts. Moreover, the high heat content of the vapors is disadvantageous since this heat is removed downstream in the mentioned coolers with no chance of utilizing it properly in other processing stages. Particularly in the indirect method, further considerable heat amounts are available, for example, in the waste water. These sources of heat could not be utilized up to the present time either.

SUMMARY OF THE INVENTION

The problem underlying the invention is to recover for proper utilization at least a part of the amount of heat hitherto escaping with the vapors, and also to conduct the above mentioned process in a manner which improves the stripping of the gas in the stripper.

To this end and in accordance with the invention, it is provided that while keeping the counterpressure constant, the temperature of the supplied ammoniacal water is elevated and the partial pressure of the components to be stripped is adequately lowered by adding compressed, uncooled saturator vapors and correspondingly reducing the steam volume.

By using a stripping gas consisting of the saturator vapors in the stripper, the partial pressures of the components of the stripped gas phase are correspondingly lowered. With unchanged temperature conditions and an unchanged total pressure, this results in an increased partial pressure difference and, consequently, improves the stripping operation. In accordance with the invention, this improvement is partly used for raising the temperature of the supplied water, since sufficient amounts of waste water are available for this purpose. The steam amount required for the stripper is thereby reduced. This reduced steam requirement corresponds to a reduced steam volume, for which the stripping gas volume is substituted. Upon making up a heat balance of the system including the stripper and the saturator, the application of the invention results in a steam economy which, with a satisfactory stripping and an assumed stripping gas amount of 1,000 m$_n^3$/h, amounts to about 5 t/h in the prior art exemplary unit mentioned above. This is a real saving of steam, even upon taking into account the power of about 40 kW needed for compressing the mentioned stripping gas amount.

In itself, the steam requirement resulting from the heat balance does not yet guarantee a satisfactory stripping. This is, the mass and heat transfer conditions are taken into account only integrally, i.e., across the entire stripper, while for the residual stripping taking place in the lower part of the stripper, the conditions at the lower trays are determining. Therefore, in principle, to assess the NH$_3$ stripping, the mass and heat transfer conditions must be computed more accurately. However, a preferred embodiment of the inventive method makes it possible to omit such a computation. To this end, the volumetric flow at the stripper sump is kept constant. The quantities affecting the stripping, namely the mass flow rate, the partial pressure difference, and the gas-to-liquid ratio, are substantially determined by the moist volumetric flow. That is why this embodiment of the inventive method makes it possible to conclude with a fair degree of certainty that in excess of a certain volumetric flow at the sump, the stripping is always satisfactory. Therefore, in a specific unit, the volumetric flow at the sump resulting in a satisfactory stripping in a pure steam operation, thus without a stripping gas, can be taken as a firm basic value for determining the steam requirement during an operation with stripping gas.

In a specific unit, the application of the invention initially only means that the mass flow rates in the stripper, the vapor condensor, and the saturator change by the amount of the stripping gas. The composition of the stripping gas is determined by the composition of the saturator vapors. In accordance with the preferred embodiment of the invention, the process is so conducted that the added saturator vapors are circulated between the stripper, the saturator, and the compressor, and the remaining part of the saturator vapor is removed from the circuit. This makes the composition of the saturator vapors independent of the stripping gas amount, since this amount is circulated. Consequently, for example, the obtained hydrogen sulfide amount remains constant. The composition of the stripping gas also is independent of the amount thereof.

While drawing a heat balance for the saturator, it becomes clear that with a constant amount of $NH_3$, the saturator outlet temperature depends on the inlet temperature of the vapors and the amount of the stripping gas.

According to another feature of the invention, it is provided to operate the saturator nozzle head with compressed saturator outlet vapors. The principal purpose of this nozzle head is to keep the crystalline ammonium sulfate in suspension in the bath of the saturator until sufficiently large crystals have formed which can be removed. In prior art methods, the nozzle head is operated with air. In the inventive method, this would lead to a considerable corrosion, because of the oxygen in the air. The operation with saturator vapors eliminates this disadvantage and means a proper utilization of the vapors.

In the following, one embodiment of the invention is explained in more detail for a better understanding.

Figure 1:
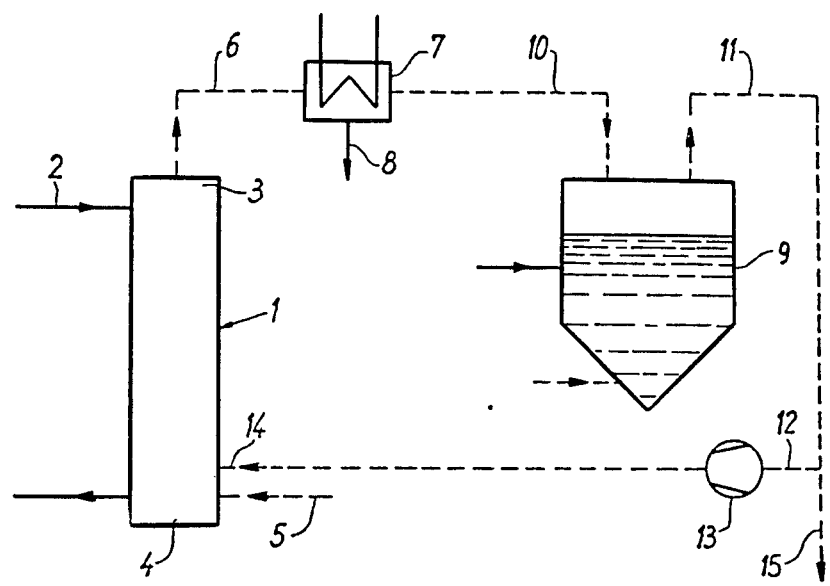
FIG. 1 shows diagrammatically a unit in accordance with the invention.

DESCRIPTION OF THE PREFERRED EMBODIMENT $NH_3$ water is supplied at 2 to the head 3 of a stripper 1. The water flows downwardly over a plurality of stripper trays, not shown in FIG. 1, and accumulates in a sump 4. By means of so called bells, not shown either, steam is conducted countercurrently and thus brought into contact with the water. The steam is supplied at 5 in the zone of sump 4.

In the head 3 of the stripper, the stripped gas component is discharged at 6 and supplied, through a heat exchanger 7 where the condensate is removed at 8, to a saturator 9 at 10. In the saturator, the ammonia is reacted with sulfuric acid to ammonium sulfate. In this process, vapors are produced which are discharged at 11. One part of the vapors is directed at 12 to a compressor 13, by which the compressed, uncooled saturator vapors are supplied at 14 to a stripper, along with the steam which is supplied at 5. A circuit of saturator vapors is thereby formed, from which vapors are branched off at 15, for further processing.

Figure 2:
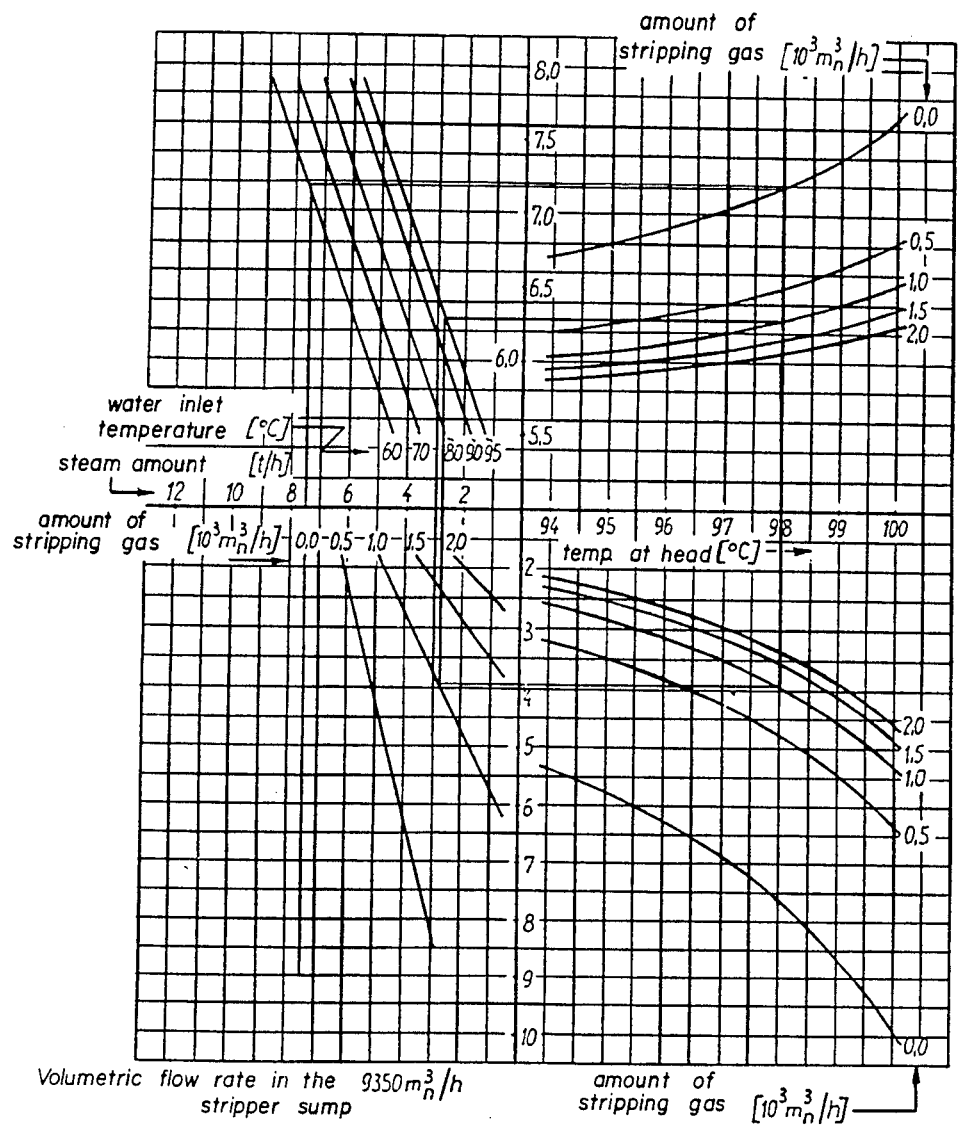
FIG. 2 is a nomogram relating to the use of saturator vapors in an $NH_3$ stripper of a unit according to FIG. 1.

The nomogram of FIG. 2 is based on an example of a bituminous coal coking plant in full operation. An indirect $NH_3$ scrubbing is provided, with an upstream $H_2S$ scrubber. The steam requirement of the stripper has been computed from the temperature at the head, the amount of stripping gas, and the water inlet temperature. The steam requirement resulting from the heat balance can be read from the two upper areas, in the sequence of temperature at the head, stripping gas amount, water inlet temperature, steam requirement. In the lower right hand area, the water content of the discharged separator vapors is plotted as a function of the temperature at the head and the stripping gas amount. The lower left hand area shows the steam requirement as a function of the water content of the saturator vapors and the stripping gas amount for a constant volumetric flow rate of 9,350 $m_n^3$/h at the sump.

It may now be learned from the two upper areas in FIG. 2 that with a constant temperature at the head, the steam requirement decreases with an increasing stripping gas amount.

Considering first the traced outer line, a water inlet temperature of 60° C. (left area above) without stripping gas (upper curve in the right area above) leads to a temperature of 98° C. at the head and a steam requirement of about 7.5 t/h. The sump temperature is about 110° C.

In the example, 26 $m^3$/h of coal water and 24 $m^3$/h of softened fresh water have been used in the $NH_3$ scrubbing. This leads to a supply of the stripper with 50 $m^3$/h of water containing 9.9 g per liter of $NH_3$, about 9 g per liter of $H_2S$, and about 6 g per liter of $CO_2$. In an operation without stripping gas, the mass flow rates at the stripper head are

| | | |
|---|---|---|
| $NH_3$: | 495 kg/h = | 652 $m_n^3$/h |
| $H_2S$: | 150 kg/h = | 99 $m_n^3$/h |
| $CO_2$: | 300 kg/h = | 153 $m_n^3$/h |

The saturator inlet is identical with the stripper outlet. At the saturator outlet, the following mass flow rates appear during an operation without stripping gas:

| | | |
|---|---|---|
| $H_2S$ | 150 kg/h = | 99 $m_n^3$/h |
| $CO_2$ | 300 kg/h = | 153 $m_n^3$/h |
| Air | 181 kg/h = | 140 $m_n^3$/H (nozzle head air) |

It has been assumed that in a stripper operation with stripping gas, the mass flow rates in the stripper and the saturator will differ from each other only by the stripping gas amount. The composition of the stripping gas also is independent of the stripping gas amount. The saturator outlet temperature depends on the temperature at the stripper head and the stripper gas amount.

An increase in the water inlet temperature additionally reduces the steam requirement.

A working point resulting in a satisfactory stripping is obtained if the steam requirement from the heat balance (areas above) equals the steam requirement from the sump volume condition. With an adjusted temperature of 98° C. at the head and a stripping gas amount of 1,000 $m_n^3$/h, the line traced through the areas below shows a steam requirement of 2.8 t/h. With these values, a water inlet temperature of about 94° C. is read in the left hand area above.

If, on the other hand, a certain water inlet temperature and stripping gas amount are assumed, the steam requirement and the temperature at the head may be determined by trial and error.

With a water inlet temperature of 94° C., the use of 1,000 $m_n^3$/h of stripping gas results in a steam economy of 4.7 t/h. This is opposed by a power requirement of 170 kw for compressing the stripping gas.

If, contrary to the shown embodiment, the process is conducted with a condensation of vapors, the stripping steam saving is somewhat smaller. In the shown embodiment (classic indirect method), a saving is so important that the indirect $NH_3$ scrubbing with a stripping gas-operated stripper in connection with a downstream $H_2S$ scrubber on the oxidation principle (e.g. stretford method) is altogether more economical than an $H_2S$-$NH_3$ circulation scrubber.

With the condensation of vapors, the saving is small among others because along with the stripping gas, steam is entrained from the stripper which then precipitates in the vapor condensator due to the heat removal. That is why the saturator outlet temperature is substantially lower than in the shown embodiment. However, the heat content of the stripping gas depending on the saturator outlet temperature, relieves the heat balance of the stripper considerably. With the stripping gas circuit in accordance with the shown embodiment, the largest part depending on the stripping gas amount, of the heat from the exothermic reaction in the circulator is supplied to the stripper where the reactions are endothermic. Therefrom it follows, that a cooling of the saturator vapors would result in an increased steam consumption.

What is claimed is:

1. A method for stripping ammoniacal water using a stripper (1) having a sump (4) at the bottom thereof and a head (3) at the top thereof, the head adapted to receive ammoniacal water (2) and the sump adapted to discharge water after it has been stripped, a saturator (9) having an inlet (10) for receiving a stripper gas component from the stripper head and an inlet for supplying sulfuric acid to the stripper gas component, the saturator having an outlet for ammonium sulfate at the bottom thereof and an outlet (11) for vapor at the top thereof, comprising the steps of:

supplying steam (5) to the stripper sump and in countercurrent flow with ammoniacal water in the stripper to strip ammonia from the ammoniacal water using the stream;

supplying ammoniacal water to the stripper head to form, with the countercurrent flow steam, stripper gas;

removing condensate from the stripper gas in a heat exchanger (7);

feeding the stripper gas less condensate to the saturator inlet (10) for receiving stripper gas;

supplying sulfuric acid to the saturator over the sulfuric acid inlet to form ammonium sulfate and a vapor;

removing the ammonium sulfate from the saturator over the ammonium sulfate outlet;

compressing an amount of vapor (13) from the saturator vapor outlet;

conveying the compressed saturator vapor (14) to the stripper sump in an uncooled state, the amount of saturator vapor augmenting the supply of steam to the stripper sump to save the steam and so that the sump is at a temperature of about 110° C. and the ammonia is stripped by saturated steam;

discharging (15) a remainder of the saturator vapor which has not been compressed so as to maintain the amount of saturator vapor supplied to the stripper sump at a constant level; the amount of saturated vapor augmenting the supply of steam to the stripper sump representing a savings in energy of steam to the stripper sump which is greater than energy required to compress the amount of vapor from the saturator vapor outlet.

2. A method of stripping ammoniacal water according to claim 1, wherein the supply of steam and amount of saturated vapor augmenting the supply of steam is supplied in indirect countercurrent flow to the ammoniacal water in the stripper.

3. A method of stripping ammoniacal water according to claim 2, wherein the steam requirement of the stripper is calculated from a temperature at the stripper head (3), the amount of stripper gas leaving the stripper (6) and the ammoniacal water inlet (2) temperature.

* * * * *